United States Patent [19]

Presttun

[11] Patent Number: 5,115,466
[45] Date of Patent: May 19, 1992

[54] COMMUNICATION NETWORK INTENDED FOR SECURE TRANSMISSION OF SPEECH AND DATA

[75] Inventor: Kare Presttun, Oslo, Norway

[73] Assignee: Alcatel STK A/S, Oslo, Norway

[21] Appl. No.: 607,912

[22] Filed: Oct. 31, 1990

[30] Foreign Application Priority Data

Nov. 13, 1989 [NO] Norway .................................. 894506

[51] Int. Cl.[5] .......................... H04L 9/00; H04L 9/08
[52] U.S. Cl. ........................................ 380/9; 380/21;
380/49; 379/94; 379/95
[58] Field of Search .................... 380/9, 21, 43, 49, 50;
379/93-95

[56] References Cited

U.S. PATENT DOCUMENTS 4,182,933  1/1980  Rosenblum ........................... 380/21
4,634,809  1/1987  Paulsson et al. .................. 379/95 X

FOREIGN PATENT DOCUMENTS 0278256  12/1986  Japan .

*Primary Examiner*—Bernarr E. Gregory
*Attorney, Agent, or Firm*—Christie, Parker & Hale

[57] ABSTRACT

This invention relates to a communication network intended for secure transmission of speech and data, including different types of subscriber terminals (10-15) and switching modules (4-6), and where the network further comprise crypto devices to undertake encryption/decryption of information transmitted through the network. At least one of the crypto devices is constituted by a crypto-pool device (7,8,9) having a number of crypto modules (CM) physically separated from the switching modules (4,5,6). Each crypto-pool (7,8,9; 20) is provided with a managing device (MA, 26) for communicating with a ciphering key distribution authority through standardized communication protocols and distribute keys to the relevant CM through a control path (25) of the crypto-pool. Each crypto-pool has access to an authentication server (AS, 16; 41,43) providing a directory of security certificates necessary in the authentication process when initiating a network connection.

10 Claims, 3 Drawing Sheets

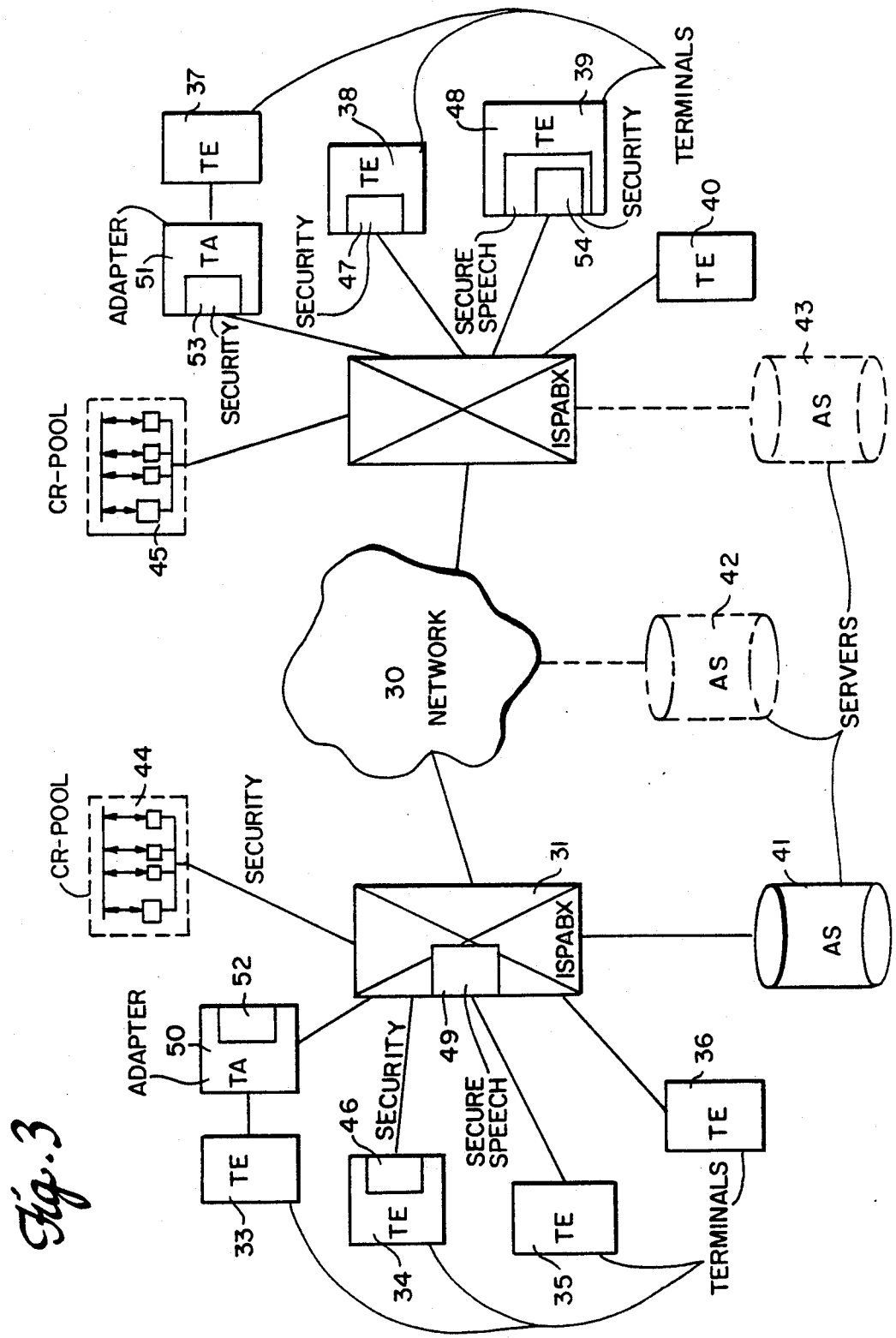

COMMUNICATION NETWORK INTENDED FOR SECURE TRANSMISSION OF SPEECH AND DATA

TECHNICAL FIELD

The present invention relates to a communication network intended for secure transmission of speech and data. It relates in particular to a network including different types of subscriber terminals and switching modules, where subscriber lines connect each subscriber terminal with a switching module and transmission links connect each switching module to other switching modules in the network, and where the network further comprises crypto devices to undertake encryption/decryption of the information transmitted through the network.

BACKGROUND ART

Generally speaking, the invention relates to enciphering and deciphering of digital communication paths in data- and/or telecommunication networks. These paths are set up between network terminals which may be any kind of equipment, application, resource, manager, users, etc., attached to the network in one way or another.

Data- and telecommunication networks are built up from communicating switching equipment as e.g. PABXs and PBXs. The switching equipment manages communication paths through sets of communication channels. These communication channels are the physical information carriers. The information signal or the datastream carried by a channel is enciphered whenever security is required. Enciphered data on a channel requires that cryptographic (crypto) devices which carries out the enciphering and deciphering process, must be attached to the data stream connected to the channel.

Such ciphering/deciphering data- and telecommunication networks are earlier known when security is required, and different solutions have been proposed.

Among the most straightforward solutions a link-to-link crypto equipment should be mentioned first. Here each transmission link has a crypto device, including encryption and decryption devices in each of its ends, which system only protects the transmission links themselves. As a second, rather straightforward solution there should be mentioned an end-to-end crypto equipment where each subscriber involved has a crypto device that can be inserted into the traffic channel after the call has been set up. In the latter case also the switches of the network will be included in the crypto traffic.

These solutions give, however, rather expensive and poorly flexible solutions as the crypto devices have to be constantly assigned to the links or to the subscribers involved.

From Japanese Patent Application No. 85-121742 filed on Jun. 4, 1985, inventor Yasuhiro Watanabe (Early-disclosure No.: 86-278256), there is known a solution where each PABX is provided with special cipher trunks for ciphering and deciphering. The terminal units are connected with the public network through office trunks in the case of ordinary communication and through cipher trunks in the case of ciphered communication.

According to the Japanese specification, ciphered communication can be executed between optional terminal units without installing a ciphering circuit and a deciphering circuit for every terminal unit. The Japanese PABX have a number of office trunks which can be used for secured as well as non-secured transmission. Secure messages are routed through one of a number of cipher trunks before transmitting the data through the public network. A central processing unit of the PABX controls connection of terminal units intended for ciphered communication to the public network through the cipher trunks. In this layout the enciphering/deciphering equipment is part of the PABX.

DISCLOSURE OF INVENTION

The main object of the present invention is to find a more flexible solution which is physically independent of the switching equipment. The main features of the invention are defined in the claims.

In the present invention the crypto modules (CM) are based on enciphering keys. These keys must be distributed from a key distribution authority. A crypto-pool manager (MA) arranged in the crypto-pool communicates with the key distribution authority through standardized communication protocols. The keys are distributed from the MA to the relevant CM through a control path of the crypto-pool.

A further object of the present invention is to make the system compatible with existing systems, and to allow an easy expansion of the system to include different related security services. Thus the services of the crypto-pool equipment according to the present invention can be made available to network terminals other than the switching equipment, if relevant.

This is obtained by arranging a separate plurality of encrypting/decrypting units called a crypto-pool at one or more secured sites in the network, and by including access equipment which allows authorized subscribers to access an encrypting/decrypting device on demand for their own communication channel, and by introducing crypto control units which also undertakes key distribution among the crypto units involved in the crypto connection.

Systems not using our crypto-pool concept have to attach the CMs to specific channels making these channels only capable of carrying enciphered data. Our invention shows a way to dynamically attaching the CMs of the channel whenever needed. Any channel can then both carry secured, i.e. encrypted data and non-secured information.

End-to-end enciphered communication requires that the end-systems (the network user equipment) involved are equipped with a CM. Our invention makes it possible for end-to-end encryption systems including a CM and enciphered communication to communicate with non-secure end-systems and vice versa. The CM in the crypto-pool is then the security representative for the non-secure end-system. The non-secure end-system does not need to know that it is connected to a secure end-system communicating enciphered data.

BRIEF DESCRIPTION OF DRAWINGS

Above mentioned and other features and objects of the present invention will clearly appear from the following detailed description of embodiments of the invention taken in conjunction with the drawings, where FIG. 3 shows how crypto-pool equipment may be introduced in an ISDN network.

BEST MODE FOR CARRYING OUT THE INVENTION

Figure 1:
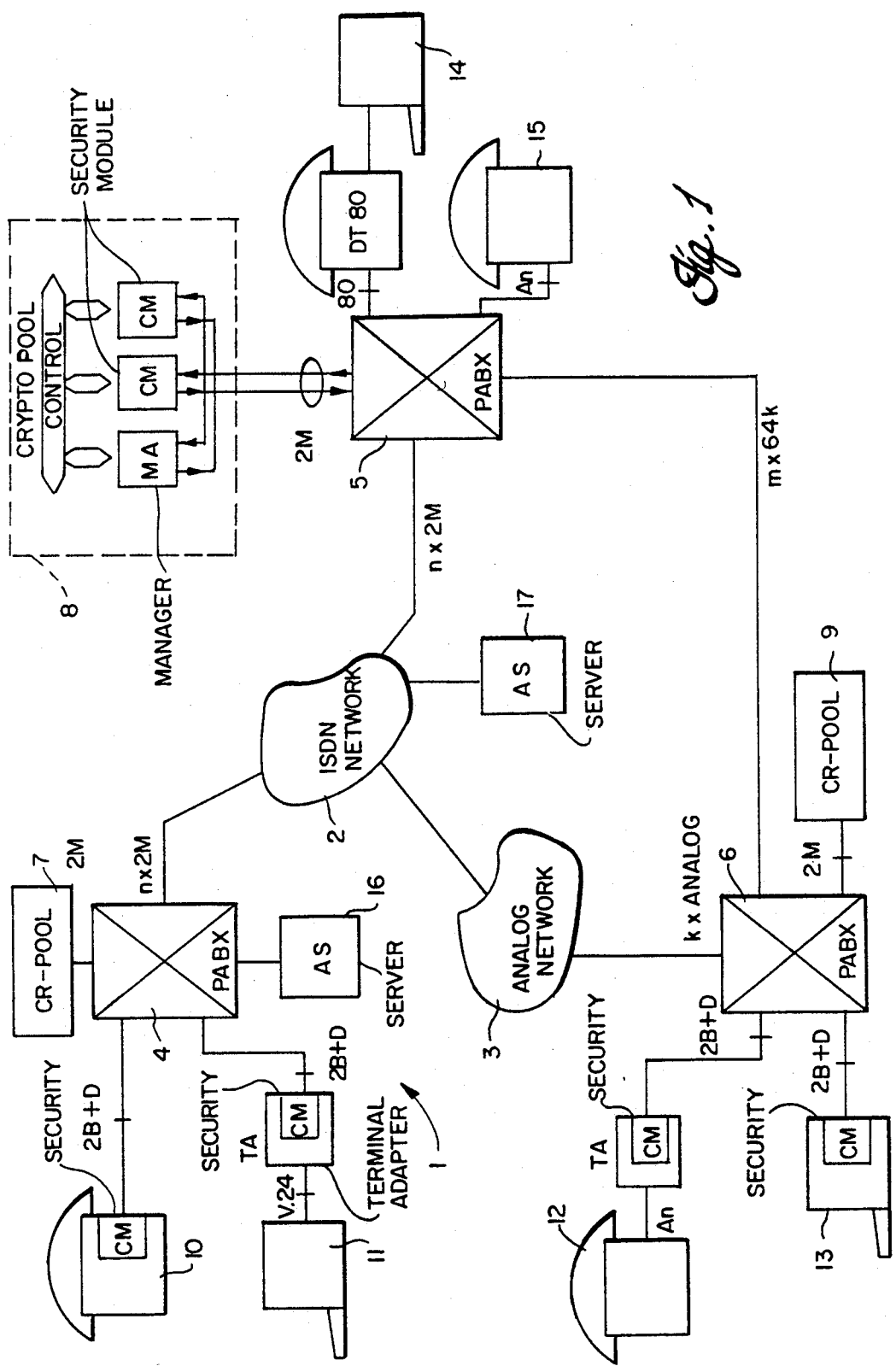
FIG. 1 shows how a crypto-pool according to the present invention may be included in different parts of a telecommunication network.

In FIG. 1 is shown how the idea of the crypto-pool can be introduced in a network including an ISDN based network and an analog network.

A network 1 is shown, comprising a public ISDN 2, a conventional analog network 3, two Private Automatic Branch Exchanges (ISPABXs) 4, 5 connected directly to the ISDN network and a PABX 6 connected directly to the analog part of the network. Three crypto-pool devices 7, 8, 9 are connected to the shown PABXs 4, 5, 6 and one of the crypto-pool devices 8 is shown in more detail. A number of different subscriber terminals 10 to 15 are indicated.

Some abbreviations are also used in the FIG. 1:
CM crypto module
MA crypto-pool manager
CR-pool crypto-pool
AS authentication server
TA terminal adapter Authentication servers 16, 17 are attached to the ISPABXs or a public ISDN offering services supporting authentication and key exchange. The subscriber equipment may not be directly involved in communication with the ASs, but their security services are offered through the ISPABX subscriber connection.

Figure 2:
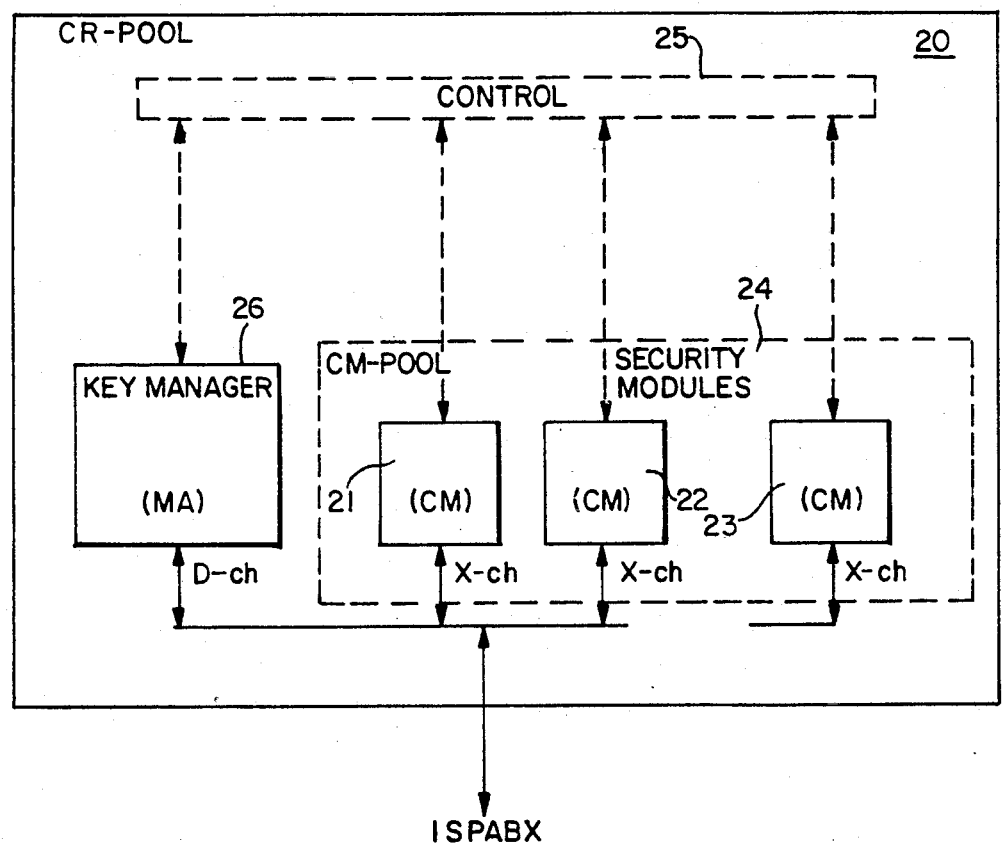
FIG. 2 shows a functional block diagram of how a crypto-pool according to the present invention is designed.

In FIG. 2 a crypto-pool 20 comprises a series of crypto-modules (CMs) 21, 22, ... 23 of which only three are shown. These crypto modules 21, 22, 23 are arranged in a group (CM-pool) 24. Within the crypto-pool 20 there are also arranged a control bus 25 and a crypto-pool manager (MA) 26. When ISDN is considered, all of the crypto modules 21, 22, 23 are connected via the B-channels to the related PABX and the crypto-pool manager 26 is also connected to the same PABX via the D-channel in ISDN. Internally in the crypto-pool 20 both the CM-pool 24 comprising the crypto modules 21, 22, 23 and the crypto-pool manager (MA) 26, are connected to the common control bus 25.

The position of the crypto-pool in a data and or telecommunication network appears from FIG. 1. The PBXs (Public Branch exchanges) are located inside the ISDN and the analog system. Our invention enables security to be added in all digital switching equipment without adding any hardware to this equipment. This flexibility is a very important aspect for the switching equipment security.

Note that this flexible crypto-pool solution is physically separated from the switching equipment. A standardized communication interface (ISDN Primary Rate Access (PRA), 30 B+D) connects the crypto-pool to the switching equipment. The crypto-pool itself contains a manager 26 which manages all activities in the crypto-pool. Among these are the control of the CMs 21, 22, 23 and coordinating the use of B-channel or CM with the switching equipment.

The D-channel of the ISDN PRA interface is routed to the MA. All the control communication to the connected switching equipment is carried out through this channel. The MA and the CM-pool are connected through the control bus 25 which only is available internally in the crypto-pool, and is used by the MA to control the CMs.

The CMs are connected to at least two B-channels each of the ISDN PRA interface. This means that there can be maximum of 15 CMs in the CM-pool. A CM can both do encipherment and decipherment on the information flowing on the attached B-channels. Enciphered information flows in one direction on one B-channel, and non-secured information flows the other way on the other B-channel. Which way the enciphered information is flowing (to or from the crypto-pool), is dependent on the CM function, encipherment or decipherment.

In the present invention the crypto modules (CM) are based on enciphering keys. These keys are exchanged between the connected parties through the authentication process, also involving the authentication server. Communication with the authentication server is carried out through standardized communication protocols. The keys are distributed from the MA to the relevant CM through the control path of the crypto-pool.

In FIG. 3 is schematically illustrated a public ISDN network 30 with switches (ISPABXs) 31, 32, terminal equipment 33-40, authentification servers 41-43 and crypto-pools 44, 45. Some scenarios will now be described to show how the security products interact in order to preserve security and provide secure communication services to the subscribers. Subscriber terminals and terminal equipment 33-40 are here systems attached to an ISDN subscriber line (ISDN Basic Access, 2B+D). Terminal adapters 50, 51 having security modules 52, 53 may also be included in the terminal equipment.

A crypto-pool 44, 45 may be activated both from a subscriber set 35, 36, 40 without security module and from a subscriber set 34, 38 with security module 46, 47. In the same manner it may be activated from a subscriber set 39 with a speech conference module 48 or without such a module, and situated within or outside the ISDN network and whether a security module and a speech conference module 49 are arranged in a PABX 31 in the ISDN network or not.

First we consider communication between two secure subscriber terminals 34, 38 both equipped with security. Then the subscribers or the subscriber equipment must be authenticated before communication can start. This is carried out by an authentication protocol between the involved subscribers. The CCITT X.509 Authentication Protocol is based on subscriber certificates. These certificates are given by the authentication server 41, 43 on request from the subscribers directly or indirectly through the ISPABX. Integrated in the protocols is also the exchange of session encryption keys.

The security services rely on the involved subscribers trusting a certification authority (CA) (not shown) controlling the involved AS or ASs. In a corporate network the CA will typically be a management utility and can either be implemented in an ISPABX or in one of the ASs attached to the network.

Let us then consider communication between non-secure subscriber terminal equipment 35, 36, 40. Security is then most interesting when the involved subscribers are resided on different ISPABXs connected through the Public Network. It is now the communication path between the involved PABXs that is interesting to secure. This requires that a crypto-pool 44, 45 is attached to each of the PABXs 31, 32.

The crypto-pool will represent the non-secure subscriber equipment concerning security matters. The secure communication between the crypto-pools will be similar to the communication between the secure subscriber terminals described in the previous scenario. The available security services will however depend on the security services provided by the crypto-pool.

The involved crypto-pools will authenticate each other after the communication request is given. The session encryption keys used will be exchanged between the crypto-pools, and all the subscriber data will be routed through both the crypto-pools for encryption/decryption.

The last scenario we shall look at is communication between secure and non-secure terminals. Then the non-secure terminal 35 will be represented by the crypto-pool 44. The secure terminal 38 and the crypto-pool 44 will authenticate each other as stated above and exchange session encryption keys. The security services available will be limited to the common set of services in the involved crypto-pool and secure terminal.

In this case the secure terminal 38 must trust the crypto-pool representing the non-secure subscriber terminal 35. As an example, this trust will be described as a part of a security policy concerned with a private ISDN.

Secure speech conference modules 48, 49 can also be included but this makes no part of the present invention. A security module 54 can as indicated be included in terminal equipment 39 having a conference module 48.

The crypto-pool is a server attached to an ISPABX through the ISDN Primary Rate Access Interface (PRA), (30B+D, 2Mb/sec) (not shown). The main service of the product is data confidentiality by offering encryption of n·64 kb/sec communication channels (maximum of n=15 at any time). This service can be requested from the attached ISPABX or ISPABX subscriber (through equal terminal equipment).

A pair of communication channels (X-ch, FIG. 2) concerned with the ISPABX interface of the crypto-pool is attached to a crypto module (CM) which receives plain text data and sends back encrypted data, or the other way round. A pool of CMs is then available for the crypto-pool manager (MA) and the requesting user. One CM can also handle a certain number of B-channels offering confidentiality on n·64 kbit/sec communication channels. Hence, if the ISDN crypto-pool is involved with a secure terminal equipment (CM integrated), the CM of the terminal must be compatible with the one used in the crypto-pool.

The standardized communication channels (bearer services) which can be handled by a CM are:

B-channel 64 kbit/sec
$H_0$-channel 384 kbit/sec (6 B-channels)
$H_{11}$-channel 1536 kbit/sec (24 B-channels)
$H_{12}$-channel 1920 kbit/sec (30 B-channels)

The management of the service is handled by the MA which is attached to the D-channel (signalling channel) (D-ch, FIG. 2) of the ISPABX interface. This channel is used for carrying information whenever interacting with the attached ISPABX subscribers (terminal users) or any other network resource attached to the ISPABX using the crypto-pool services.

The interactions carried out through the D-channel are concerned with:
 exchange of encryption keys
 authentication and certificate exchange
 B-channel and communication channel identification for CM attachment.
 Handling of crypto-pool service requests.
 Service charging (only when directly interacting with subscriber equipment, otherwise handled by the ISPABX).

The advantages of the present invention are:
it is concerned with securing communication paths between ISPABXs connected through an insecure or not trusted network (e.g. Public Network). By using the crypto-pool services the communication channels between the ISPABXs can both be used to carry plain text and encrypted information. Otherwise some specific communication channels must physically be connected to a CM and dedicated for communicating encrypted information.
non-secure subscriber equipment can communicate with secure subscriber equipment through the crypto-pool without any weakening of existing security.
it can easily be adapted to any available ISPABX in the market due to the standardized ISPABX interface (ISDN PRA).

The services of the crypto-pool can be accessed in three different ways:
 the access to the crypto-pools are obtained directly by the attached ISPABX. In this case neither subscribers nor terminal equipment are aware of the crypto-pool usage. This approach provides confidential communication between ISPABXs.
 the access to the crypto-pools are obtained directly by the subscriber through the terminal equipment. The terminal equipment is attached to the same ISPABX as the available crypto-pool. This approach is used when the terminal equipment is responsible for the end-to-end security. It must then have installed a security module which is a piece of software making it possible to communicate with the crypto-pool manager. The ISPABX does not in this case need to know of the attached crypto-pool.
 the access to the crypto-pools are undertaken indirectly by accessing an ISPABX service. Then the ISPABX security service is provided using the crypto-pool service. The service is by the subscriber or terminal equipment accessed as a supplementary service through the D-channel.

The authentication Server (AS), schematically shown in FIGS. 1 and 3, provides a directory of security certificates. Certificates are used by subscribers, terminal equipment or other network resources in the authentication process when initiating a network connection. Each of these network terminals have their own certificate.

The AS is accessed through standardized protocols based on CCITT x.500 series of recommendations (The directory service). When the AS is attached to an ISPABX, an ISDN interface is used for the network access. Which interface (ISDN Basic Access or ISDN Primary Rate Access) is dependent on the traffic load of the AS.

The advantages of the AS are:
 on-line distribution of certificates
 flexibility regarding changing and exchange of certificates.
 access through standardized OSI protocols making the ISPABX and security system independent.

options for a distributed certificate database gathering more than one AS. The management utility Certification Authority (CA) is implemented in one of the ASs or the involved ISPABXs to manage the certificate distribution.

The above detailed description of embodiments of this invention must be taken as examples only and should not be considered as limitations on the scope of protection.

I claim:

1. Communication network for secure transmission of information, comprising:
    at least three subscriber terminals,
    at least two switching modules including a first switching module associated with a first and second said subscriber terminal and a second switching module associated with a third said switching module,
    subscriber lines to connect each of the subscriber terminals with its associated said switching module,
    at least one transmission link connecting the switching modules to each other to thereby form a switched network, and
    at least two cryptographic devices, including a first cryptographic device associated with the first switching module and a second cryptographic device associated with the second switching module, to undertake encryption/decryption of at least some of the information transmitted through the switched network between the first switching module and the second switching module,
    wherein:
    the first cryptographic device is physically separated from said first switching module,
    the first cryptographic device uses standardized interface and communication protocols, to communicate with said first switching module and, via said first switching module, with said first and second subscriber terminals,
    said first cryptographic device is a crypto-pool device comprising a plurality of cryptographic modules for simultaneous encryption/decryption of respective different information being transmitted between the associated said first switching module and one or more other said switching modules, each said cryptographic module providing a non-secure communication path via said first switching module to a currently designated one of said at least two subscriber terminals, and a secure communication path via said first switching module, said switched network and a currently designated said second switching module to a currently designated said second cryptographic device.

2. Network according to claim 1, wherein each crypto-pool device further comprises a managing device for communicating with a ciphering key distribution authority through said standardized communication protocols and for distributing ciphering keys to the relevant cryptographic module through a control path of the crypto-pool.

3. Network according to claim 1, wherein each crypto-pool device has access to an authentication server providing a directory of security certificates necessary in the authentication process and encryption key exchange, when initiating a network connection.

4. Network according to claim 1, wherein the crypto-pool devices are arranged in a public ISDN environment having a number of ISPABX switches.

5. Network according to claim 4, wherein the crypto-pool may be activated indirectly to accessing an ISPABX service through an end-to-end D-channel or a dedicated B-channel.

6. Network according to claim 1, wherein the crypto-pool device may be activated both from a subscriber terminal without a security module and from a subscriber terminal with a security module.

7. Network according to claim 1, wherein the crypto-pool may be activated directly by an attached PABX or ISPABX, so that no subscriber terminal is aware of any associated crypto-pool usage.

8. Network according to claim 1, wherein the crypto-pool may be activated directly by a security module at a subscriber terminal attached to the same ISPABX as said crypto-pool.

9. Network according to claim 1, wherein the standardized communication channels which can be handled by one or more of said crypto modules are:
    B-channel 64 kbit/sec
    $H_0$-channel 384 kbit/sec
    $H_{11}$-channel 1536 kbit/sec
    $H_{12}$-channel 1920 kbit/sec.

10. Network according to claim 1, wherein
    one of the subscriber terminals is a non-secure terminal and another one of the subscriber terminals is a secure terminal, and
    the secure terminal and the crypto-pool each further comprise means for authenticating each other and exchanging session encryption keys,
    whereby the non-secure terminal can communicate with the secure terminal through the crypto-pool without any weakening of existing security.

* * * * *